United States Patent [19]
Uetani et al.

[11] 3,892,591
[45] July 1, 1975

[54] DRY CELL AND MANUFACTURE OF THE SAME

[75] Inventors: Yoshio Uetani; Rokurou Ikebata; Kentaro Kashiwaya; Syoetsu Sugihara; Kaoru Hisatomi, all of Ibaraki, Japan

[73] Assignee: Hitachi Maxell, Ltd., Osaka, Japan

[22] Filed: Feb. 20, 1973

[21] Appl. No.: 333,709

[30] Foreign Application Priority Data
Dec. 7, 1972  Japan.............................. 47-12314

[52] U.S. Cl. ................ 136/102; 136/125; 136/145; 136/146; 136/148
[51] Int. Cl. ............................................ H01m 3/02
[58] Field of Search .......... 136/102, 131, 145, 148, 136/125, 128, 146, 107; 162/123

[56] References Cited
UNITED STATES PATENTS

| | | | |
|---|---|---|---|
| 1,434,303 | 10/1922 | Marshall | 136/131 |
| 1,640,488 | 8/1927 | Deibel et al. | 136/131 |
| 1,654,038 | 12/1927 | Deibel et al. | 136/131 |
| 2,283,379 | 5/1942 | MacCallum | 136/131 |
| 3,246,767 | 4/1966 | Pall et al. | 136/145 X |
| 3,428,494 | 2/1969 | Watanabe et al. | 136/102 |

*Primary Examiner*—Winston A. Douglas
*Assistant Examiner*—John F. Niebling
*Attorney, Agent, or Firm*—Stewart and Kolasch, Ltd.

[57] ABSTRACT

A dry cell containing a separator which comprises a very fine paper having a thickness of at least about 10 microns and a density of about 0.65 to 0.85 g./cm$^3$, said paper being coated with a paste material. Alternatively, the separator can comprise two layers of paper, a layer of said very fine paper and a layer of less fine paper, the latter having a density of about 0.45 to 0.55 g./cm$^3$ and provided with a coating of paste material. In the dry cell, the separator is mounted parallel to the anode in such a manner that the side of said separator on which the paste is coated is placed together with said anode. The opposite side of said separator is in contact with the depolarizer.

17 Claims, 2 Drawing Figures

3,892,591
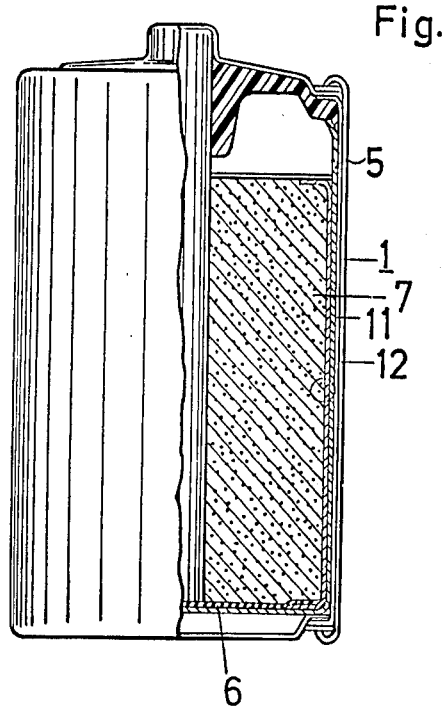
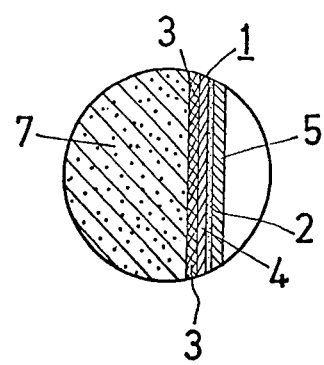

DRY CELL AND MANUFACTURE OF THE SAME

The present invention relates to a dry cell and the manufacture of the same. More particularly, it relates to a dry cell comprising an improved separator located between the zinc anode can and the depolarizer, said separator increasing the electrical discharge capacity and the retention capacity of the dry cell and also functioning to prevent the leakage of the electrolyte from the cell.

In known dry cells, particularly the Leclanche cell, in order to increase the electrical discharge capacity thereof, the so-called "paper-lined type" construction has been adopted from the necessity of increasing the volume of a depolarizer to be put in the dry cells and lessening the electrical resistance between the zinc anode and the filled depolarizer. The paper-lined type dry cell comprises a separator made of a paper containing a paste layer formed between the zinc anode and the depolarizer.

The dry cells which have adopted the paper-lined type construction have utilized a less fine paper as a base paper to keep the passage of the electrolyte through the paper smooth, thereby removing, while diffusing, the products formed by the electrical discharge reaction around the surface of the zinc anode so that the electrical discharge is produced without any obstacle. For these reasons, a base paper having a thickness of about 100 to 200 microns and a density of about 0.45 to 0.55 g./cm$^3$ has been used.

Although the use of said base paper has resulted in expanding the electrical discharge capacity for certain kinds of dry cells, such dry cells, when stored for a long period of time, often exhibit the problem that the paste material, which bonds the base paper with the zinc anode and conveys the electrolyte to the reaction surface of the zinc anode, migrates through said paper into the direction of the depolarizer because of the low density of the base paper. As a result, the base paper fabric is gradually exposed and eventually comes into direct contact with the surface of the zinc anode, which produces pinholes on the zinc anode because of the dissolution of the zinc anode or the deterioration of the cell capacity because of the lack of the electrolyte necessary for the electrical discharge at the reaction surface of the zinc anode.

Attempts have been made to overcome these drawbacks by using a thicker base paper and a larger amount of paste material on said base paper. However, these attempts have necessarily caused an increase in resistance against the ionic conduction of the separator resulting in the deterioration of the electrical discharge capacity of the dry cell and also the lessening of the depolarization of the depolarizer because of the large amount of paste material which migrates into the depolarizer. The thick layer of paste material does not permit the reaction product of the zinc anode formed by the electrical discharge to smoothly diffuse itself into the depolarizer, resulting in the formation of a layer having a diaphragm property and made of the reaction product which is sedimented in the paste layer. Said layer of the reaction product raises the zinc ion concentration at the surface of the zinc anode, wherein the electrolyte contained in the depolarizer is drawn by osmotic pressure into an air space located between the top of the depolarizer and the sealing material of the zinc anode can. This phenomenon caused the leakage of the electrolyte from the dry cell.

It is an object of the present invention to provide a dry cell containing as a separator a very fine paper coated with a paste material, said paper having a density of about 0.65 to 0.85 g./cm$^3$.

Another object of the present invention is to provide a dry cell containing as a separator a very fine paper having a density of about 0.65 to 0.85 g./cm$^3$ next to a coarser paper having a density of about 0.45 to 0.55 g./cm$^3$, said coarser paper being coated with a paste material in an amount of about 10 to 50 g./m$^2$.

A further object of the present invention is to provide a method of manufacturing a separator which can be used for a dry cell.

Other objects, features and advantages of the present invention will become apparent during the course of the following description and the accompanying drawing.

In the drawing:

FIG. 1 is a half section view of a dry cell containing the separator of the present invention; and FIG. 2 is an extended view of that portion which is encircled in FIG. 1.

In accordance with the present invention, the use of a very fine paper having a density of about 0.65 to 0.85 g./cm$^3$ as a base paper of the separator in the dry cell functions to prevent a paste material disposed on said base paper from migrating through said base paper. It also prevents materials which can assist the depolarizer in its electroconductivity, such as acetylene black and the like, or fine particles of manganese dioxide which are used for the depolarizer, from migrating through said base paper onto the zinc anode, thereby improving the retention capacity of the dry cell. Using a base paper with said density and as thin as possible helps keep the ion permeability of the separator in a favorable state and facilitates the migration of the zinc ion formed by the electrical discharge reaction promptly into the depolarizer without permitting the reaction product to be accumulated around the zinc anode. Furthermore, a dry cell possessing superior electrical discharge capacity and the ability to prevent the electrolyte from cell leakage can be achieved by using a very fine base paper with a thickness of about 10 to 100 microns.

When a very fine paper is used as the base paper, its smooth surface sometimes makes the paste material less adhesive thereto and thus it is difficult to apply a paste material thereon. Furthermore, when a very thin paper is chosen for use as a base paper, said paper tends to become wrinkled and folded upon its manufacture due to its mechanical weakness. Accordingly, further advantageous results may be obtained, without any decrease in the characteristics of the base paper per se of the present invention by using at least two layers of paper as the base paper. These layers of base paper are placed together, one layer being a coarser paper having a density of about 0.45 to 0.55 g./cm$^3$ and the other being a very fine paper having a density of about 0.65 to 0.85 g./cm$^3$ and a thickness of about 10 to 100 microns. However, it should be noted that the purpose that the present invention intends to achieve may be accomplished successfully by the use of one layer of said very fine paper alone, coated with said paste material. However, when said two layers of paper are utilized as the separator of the dry cell of the present invention, the exterior side of the coarse paper, i.e., that side facing the zinc anode should always contain the paste material coated thereon. Said exterior should be mounted parallel to the zinc anode in the dry cell of the present invention. Although this makes the base paper comparably thick, it may be possible to place the separator close to the zinc anode, keep the ion permeability of the separator in a fine state, and diffuse effectively the product formed by the electrical discharge reaction of the zinc anode in the direction of the depolarizer.

In accordance with the present invention, the purpose of decreasing the other disadvantages may also be achieved by moistening the base paper, prior to the application of the paste material, with substantially the same solvent as that used for the paste material. Such pre-treatment of the base paper, i.e., moistening the base paper with said solvent, helps the uniform application of the paste thereon because it prevents the paste material from stopping the flow on the surface of the base paper, said stopping of the flow being caused by the rapid absorption of methyl alcohol used as a solvent for the paste into the base paper and the rapid drying of the paste. Accordingly, the pre-treatment of the base paper is particularly effective when the volatility of the solvent and the viscosity of the paste are high. The pre-treatment of the base paper is achieved by spraying a solvent, for example, methyl alcohol, on the surface of the base paper. Water may also be used for moistening the base paper. However, it should be noted that when the surface of the base paper is moistened with water prior to being coated, such a treatment causes a considerable decrease in the mechanical strength of the paper, in some cases up to one third of its strength, because the coherence of the fiber is weakened, and therefore, it is necessary to weaken the tensile strength applied to the base paper upon coating. Thus, if a slight unevenness of the surface of the separator can be tolerated, it will be better not to use water for this purpose.

In order to achieve the purpose of the present invention, the selection of the kind and nature of the base paper is of significance. Likewise, the thickness of the paste material to be coated on the base paper and the selection of a binder to be used together with the paste material are important factors in obtaining the favorable results of the present invention. In particular, the amount of the paste material coated on the separator paper produces a strong influence on the efficiency of the dry cell of the present invention. The paste material according to the present invention may be used in an amount of about 10 to 50 g./m$^2$. The use of the paste material in amounts below and above said amounts do not give advantageous results. When the amount of the paste material is less than about 10 g./m$^2$, the paste can not adequately function to place the base paper close to the zinc anode can. As a result, it will be difficult to carry out the electrical discharge reaction in a uniform manner and to retain the electrolyte around the surface of the anode in an adequate amount necessary for said electrical discharge reaction. These problems become a cause of deteriorating the efficiency of the dry cell of the present invention upon prolonged storage. On the other hand, the use of the paste material in an amount more than about 50 g./m$^2$ produces a high resistance in the separator, resulting in a decrease in the electrical discharge capacity and the leakage of the electrolyte which is drawn by osmotic pressure and pulled out of the depolarizer into the air space.

The paste materials which may be coated on the base paper of the present invention include natural and processed starch, such as, for example, corn starch, potato starch, wheat starch, esterified starch, cross-linked starch, esterified cross-linked starch, etherified cross-linked starch and etherified starch, cellulosic derivatives, such as, for example, methyl cellulose, carboxymethyl cellulose and hydroxyethyl cellulose, and synthetic materials, such as, for example, polyvinyl alcohol, polyethylene oxide and polyacrylic acid amide. Among these materials, the processed starch, such as esterified cross-linked starch and etherified cross-linked starch is particularly preferred. Processed starch is resistant to the electrolyte and is also effective in retaining the electrolyte and preventing the zinc anode from being corroded. When wheat starch is used, the starch should be applied at around room temperature. The application of higher temperature causes the gelation of the wheat starch, which causes a rapid increase in its viscosity, resulting in making the application of a coating on the base paper impossible.

As to binders which can be used to adhere the paste material to the base paper of the present invention, there may be used those cellulosic derivatives and synthetic materials which are also used as the paste material and which do not react with the elctrolyte upon contact therewith. It is preferable to use a binder which does not raise the viscosity of the solvent contained in the paste to a higher extent than necessary and which possesses the appropriate adhesiveness in a small amount.

As the solvent of the paste, there may be used water, an alcohol, such as methyl alcohol, and a mixture thereof. There may be advantageously used a volatile liquid, such as, for example, methyl alcohol. The use of such a volatile liquid produces another advantageous result, i.e., no heating is necessary to remove the solvent, and thus the operation is smooth and simple. The use of another liquid which is more viscous than methyl alcohol, for example, water containing dissolved polyvinyl alcohol, together with said alcohol, is also possible. In this case, the viscosity of the starch solution becomes higher than when alcohol is used alone, and the coating of the starch solution is easy to apply.

The starch solution coated on the separator paper of the present invention may be dried by placing it in the air or by wind-drying it in order to prevent the starch from rapidly turning into a gel.

When the separator of the present invention is used in dry cells which contain, as the main electrolyte, zinc chloride in an amount of about 17 to 30 per cent by weight and ammonium chloride in an amount of not more than 10 per cent by weight, said dry cells possess the best possible efficiency because of the favorable ion diffusibility of the depolarizer thereof. On the other hand, although the separator of the present invention may also be effective even when used for conventional dry cells containing ammonium chloride as a main electrolyte, the same effect as that produced by dry cells containing zinc chloride as the main electrolyte is not to be expected because the ion diffusibility of the depolarizer of these dry cells is not always in a preferred state.

The following examples serve the explanation of the details of the specific embodiments of the present invention, but are not intended to be limitative thereof.

EXAMPLE 1

Five parts of etherified starch cross-linked by epichlorohydrin and 1 part of methyl cellulose alcohol-solubilized by the introduction of the hydroxypropoxy group were added to and mixed with 20 parts of methyl alcohol. By mixing, the methyl cellulose was dissolved in the alcoholic solution, and a solution was obtained wherein the etherified cross-linked starch suspended in the alcohol. The solution was coated in an amount of about 20 g./m$^2$, said amount including the paste material and the binder, but not the solvent. The solution was coated on the exterior side of a coarse paper placed together with a very fine paper, said coarse paper having a density of about 0.50 g./cm$^3$ and a thickness of about 40 microns and said very fine paper having a density of about 0.75 g./cm$^3$ and a thickness of about 20 microns. Said two layers of base paper were sprayed with methyl alcohol prior to coating and were coated with said alcoholic solution so that the coated layer of the paste material was formed very uniformly and evenly on the surface thereof.

Into a zinc anode can 5 having an outer diameter of 30 mm. and a height of 52 mm., a rectangular separator 1, having a size of about 50 by 95 mm., was mounted in a cylinder in such a way that the exterior paste layer side 2 of said separator is inserted facing the interior side of the zinc anode can 5. A round insulating paper 6 was put on the bottom wall of the zinc anode can 5 to insulate the can from the depolarizer 7.

Into the zinc anode can 5, there were added 42 grams of the previously molded depolarizer 7 having a diameter of about 26 mm. and a height of about 37 mm., the depolarizer consisting of 55 percent by weight of manganese dioxide, 12 percent by weight of acetylene black, 1 percent by weight of zinc oxide as a buffer, and 32 per cent by weight of the electrolyte having a constituency of 20 per cent by weight of zinc choride, 5 per cent by weight of ammonium chloride and 75 percent by weight of water. 8.5 grams of said electrolyte were tamped into the depolarizer. A carbon rod 8 was then inserted into the center of the depolarizer, and the upper end of the separator 1 was folded down over the top of the depolarizer. Thereafter, the depolarizer 7, the separator 1, and the zinc anode can 5 were put close together under an elevated pressure in such a manner that the very fine paper 3 of the separator 1 was placed next to the coarser paper 4 which was in intimate contact with the inner side wall of the zinc anode can 5 through the intermediate paste layer 2. The zinc anode can so manufactured was then arranged by sealing the open end portion of zinc anode can with a sealing material 9 made of polyethylene and a terminal plate 10 and by surrounding the can with an insulation cylinder 11 and an outer jacket 12. A D size cell assembled as described above and using the separator of the present invention is shown in FIGS. 1 and 2.

EXAMPLE 2

To a solution of 1.5 parts of polyvinyl alcohol in 5 parts of water, 20 parts of methyl alcohol was added. Then 8 parts of starch containing wheat starch and corn starch esterified by hydroxyethyl ether, in a ratio of 1 : 4 was mixed therewith. The starch solution was coated on a very fine paper having a density of about 0.80 g./cm$^3$ and a thickness of about 10 microns in an amount of about 40 g./m$^2$, the amount being calculated without considering the solvent used for the starch suspension. The paper was sprayed with methyl alcohol prior to coating similarly as employed in Example 1. A D size cell was also assembled using the same operation as shown in Example 1.

EXAMPLE 3

One part of hydroxyethyl cellulose was dissolved in 34 parts of water while heating the water to about 60 °C. nine and one half parts of wheat starch were then added to the solution which was previously cooled to around room temperature. The starch suspension was coated on a coarse paper having a density of about 0.45 g./cm$^3$ and a thickness of about 40 microns, said coarse paper being in intimate contact with a very fine paper having a density of about 0.7 g./cm$^3$ and a thickness of about 50 microns. The starch solution was applied in an amount of about 10 g./m$^2$, said amount being calculated without including the amount of the solvent used for the starch suspension. The two layers of paper were sprayed with water prior to coating, the spraying with said water solvent used for the starch solution helping to insure that the paste material is coated uniformly on the base paper.

With the separator used, a D size cell was assembled in the same manner as described in Example 1.

Comparative Examples 1 to 3:

Using a base paper having a thickness of about 130 microns and a density of about 0.5 g./cm$^3$, three of such base papers were coated with the same solutions and in the same amounts as indicated in Examples 1, 2 and 3. A D size cell was assembled for each base paper using the same procedures as shown in Example 1. The following are the amount of the paste material coated on said base paper, and the constituents of the paste material and the binder: ,

TABLE 1

| Comparative Examples | Amounts Coated, g./m$^2$ | Paste Materials Starch | Binder |
|---|---|---|---|
| 1. | 20 | Etherified cross-linked starch | Methyl cellulose with the hydroxy-propoxy group introduced |
| 2. | 40 | Esterified starch | Polyvinyl alcohol |
| 3. | 10 | Wheat starch | Hydroxyethyl cellulose |

The dry cells manufactured by the Examples and the Comparative Examples above were tested with respect to their short circuit current and their discharge capacity at the time of their manufacture and then after having been stored for 3 months at 45°C. The dry cells stored at 20°C for 3 months were continuously discharged thoroughly at a load resistance of 1 ohm. Then the number of cell leakages were determined after an additional 30 day period. The test on the discharge capacity was carried out by providing a terminal voltage of 0.9 volt while being continuously discharged at a constant load resistance of 2 ohms. Each of 100 dry cells was used for the test.

Table 2

| Examples | Short Circuit Current, (A) Initial | Short Circuit Current, (A) After Storage | Discharge Capacity, (min.) Initial | Discharge Capacity, (min.) After Storage |
| --- | --- | --- | --- | --- |
| 1. | 9.0 | 8.2 | 300 | 280 |
| 2. | 8.3 | 7.5 | 270 | 250 |
| 3. | 10.5 | 9.3 | 350 | 310 |
| Average | 9.3 | 8.3 | 310 | 280 |
| Comparative Examples | | | | |
| 1. | 8.2 | 6.5 | 290 | 190 |
| 2. | 7.5 | 6.7 | 270 | 210 |
| 3. | 9.0 | 6.2 | 330 | 160 |
| Average | 8.3 | 6.3 | 290 | 190 |

Table 2a

| Examples | Cell Leakages, Numbers |
| --- | --- |
| 1. | 1 |
| 2. | 7 |
| 3. | 0 |
| Average | 3 |
| Comparative Examples | |
| 1. | 12 |
| 2. | 25 |
| 3. | 8 |
| Average | 15 |

Table 2 shows that the dry cells using the separator of the present invention are substantially improved in their efficiency and discharge capacity at the time of manufacture, but a rather considerable difference from the dry cells manufactured in the Comparative Examples above can be found after storage. The dry cells of the present invention have the advantage of exhibiting a uniform efficiency. Table 2a shows that the dry cells of the present invention are superior in preventing cell leakage which is one of the factors which determines whether or not a dry cell is superior in its efficiency.

The invention being thus described, it will be obvious that the same may be varied in many ways. Such variations are not to be regarded as a departure from the spirit and scope of the invention, and all such modifications as would be obvious to one skilled in the art are intended to be included herein.

What is claimed is:

1. A dry cell containing a zinc anode, a depolarizer and a separator disposed therebetween, said separator being composed of a base paper comprising a layer of very fine paper having a thickness of at least about 10 microns and a density of about 0.65 to 0.85 g/cm$^3$, the side of said base paper facing the zinc anode being coated with a paste material, and the opposite and uncoated side thereof facing the depolarizer.

2. The dry cell according to claim 1, wherein the base paper comprises very fine paper having a thickness of at least 10 microns and a density of about 0.65 to 0.85 g./cm$^3$ and coarse paper having a density of about 0.45 to 0.55 g./cm$^3$, said very fine paper and said coarse paper in contact with each other and forming two layers.

3. The dry cell according to claim 1, wherein the paste material is used in an amount of about 10 to 50 g./m$^2$.

4. The dry cell according to claim 2, wherein the paste material is coated on the surface of the base paper in an amount of about 10 to 50 g./cm$^2$.

5. The dry cell according to claim 1, wherein the paste material coated on the surface of the base paper is at least one processed starch selected from the group consisting of esterified starch, etherified starch, cross-linked starch, esterified cross-linked starch and etherified cross-linked starch.

6. The dry cell according to claim 2, wherein the paste material coated on the surface of the base paper is at least one processed starch selected from the group consisting of esterfied starch, etherified starch, cross-linked starch, esterified cross-linked starch and etherified cross-linked starch.

7. The dry cell according to claim 1, wherein said paste material is coated on the base paper in an amount of about 10 to 50 g./m$^2$, said paste material being at least one member selected from the group consisting of esterified starch, etherified starch, cross-linked starch, esterified cross-linked starch and etherified cross-linked starch.

8. The dry cell according to claim 2, wherein the coarser paper side of the two layers of the base paper is coated with about 10 to 50 g./m$^2$ of at least one processed starch selected from the group consisting of esterified starch, etherified starch, cross-linked starch, esterified cross-linked starch and etherified cross-linked starch.

9. The dry cell according to claim 5, wherein the paste material is etherified starch cross-linked by epichlorohydrin.

10. The dry cell according to claim 8, wherein the paste material is esterified starch.

11. The dry cell according to claim 2, wherein the paste material is wheat starch.

12. The dry cell according to claim 1, wherein the depolarizer contains an electrolyte comprising zinc chloride in an amount of about 17 to 30 per cent by weight and ammonium chloride in an amount of not more than 10 per cent by weight.

13. The dry cell according to claim 2, wherein the depolarizer contains an electrolyte comprising zinc chloride in an amount of about 17 to 30 per cent by weight and ammonium chloride in an amount of not more than 10 per cent by weight.

14. The dry cell according to claim 1, wherein the paste material is used in an amount of 10 to 50 g./m$^2$ and is at least one processed starch selected from the group consisting of esterified starch, etherified starch, cross-linked starch, esterified cross-linked starch and etherified cross-linked starch, and the depolarizer contains an electrolyte comprising zinc chloride in an amount of about 17 to 30 per cent by weight and ammonium chloride in an amount of not more than 10 per cent by weight.

15. The dry cell according to claim 2, wherein the paste material is used in an amount of 10 to 50 g./m$^2$ and is at least one processed starch selected from the group consisting of esterified starch, etherified starch, crossed linked starch, esterified cross-linked starch and etherified cross linked starch, and the depolarizer contains an electrolyte comprising zinc chloride in an amount of about 17 to 30 per cent by weight and ammonium chloride in an amount of not more than 10 per cent by weight.

16. A separator for use in a dry cell composed of a very fine paper having a thickness of at least about 10 microns and a density of about 0.65 to 0.85 g/cm$^3$, only one side of said very fine paper being coated with a starchy paste material.

17. A separator for use in a dry cell composed of a very fine paper having a thickness of at least about 10 microns and a density of about 0.65 to 0.85 g/cm$^3$ and a coarse paper having a density of about 0.45 to 0.55 g/cm$^3$, said very fine paper and said coarse paper being in contact with each other and forming two layers, only one side of said two layers being coated with a starchy paste material.

* * * * *